(12) United States Patent
Sung et al.

(10) Patent No.: US 8,616,642 B2
(45) Date of Patent: Dec. 31, 2013

(54) FOLD-AND-DIVE APPARATUS FOR VEHICLE SEAT

(75) Inventors: Young Bok Sung, Hwaseong-si (KR); Chan Ho Jeong, Seoul (KR); Tae Hoon Lee, Hwaseong-si (KR); Seon Chae Na, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/210,189

(22) Filed: Aug. 15, 2011

(65) Prior Publication Data

US 2012/0139313 A1 Jun. 7, 2012

(30) Foreign Application Priority Data

Dec. 7, 2010 (KR) .................. 10-2010-0124517

(51) Int. Cl.
*B60N 2/02* (2006.01)
*B60N 2/04* (2006.01)

(52) U.S. Cl.
USPC ........................................ 297/341; 297/334

(58) Field of Classification Search
USPC .................... 297/378.12, 378.14, 334, 341
See application file for complete search history.

(56) References Cited

U.S. PATENT DOCUMENTS

| | | | | |
|---|---|---|---|---|
| 4,101,169 A | * | 7/1978 | Muraishi et al. | 297/341 |
| 4,497,518 A | * | 2/1985 | Nishimura et al. | 297/341 |
| 5,352,019 A | * | 10/1994 | Bauer et al. | 297/341 |
| 7,556,315 B2 | * | 7/2009 | Nathan et al. | 297/378.12 |
| 2004/0026978 A1 | | 2/2004 | Kim | |
| 2004/0051361 A1 | * | 3/2004 | Rausch et al. | 297/341 |
| 2007/0257536 A1 | * | 11/2007 | Nemoto | 297/341 |

FOREIGN PATENT DOCUMENTS

| | | |
|---|---|---|
| JP | 2005-074101 A | 3/2005 |
| KR | 1020040043827 A | 5/2004 |
| KR | 1020050041233 A | 5/2005 |
| KR | 1020050038093 A | 6/2005 |
| KR | 1020060091880 A | 8/2006 |
| KR | 1020090061795 A | 6/2009 |

* cited by examiner

*Primary Examiner* — David Dunn
*Assistant Examiner* — Timothy J Brindley
(74) *Attorney, Agent, or Firm* — Morgan, Lewis & Bockius LLP

(57) ABSTRACT

A fold-and-dive apparatus for a vehicle seat is provided, which includes a protrusion projecting from a seat back that is folded toward a seat cushion, a moving block moving on a connection link by the protrusion when the seat back is folded, a lock plate connected to the moving block by a cable to move upward and downward on the connection link so as to restrain and release the seat cushion, and an elastic member having both end portions installed in the seat cushion and a vehicle body, respectively, to make the seat cushion slide forward. Since the seat cushion slides forward when the seat back is folded, the overlap of bolster portions between the seat back and the seat cushion is minimized, and thus the evenness of the seat back that is folded toward the seat cushion and the luggage trim is maximally improved.

5 Claims, 11 Drawing Sheets

FOLD-AND-DIVE APPARATUS FOR VEHICLE SEAT

CROSS-REFERENCE TO RELATED APPLICATION

This application is based on and claims priority from Korean Patent Application Number 10-2010-0124517 filed Dec. 7, 2010, the entire contents of which application is incorporated herein for all purposes by this reference.

BACKGROUND OF INVENTION

1. Field of Invention

The present invention relates to a fold-and-dive apparatus for a vehicle seat, and more particularly, to a fold-and-dive apparatus for a vehicle seat, which makes a seat cushion slide forward when a seat back is folded.

2. Description of Related Art

Generally, vehicle seats are trends of development of a complex structure due to addition of various convenience functions, such as a storage function for cargo, a work-in function for convenient riding of passengers for a seat of $3^{rd}$ row, a full-flat function of seats of $2^{nd}$ and $3^{rd}$ rows, and the like, in addition to a seating function for passengers.

In the case of loading luggage in a vehicle having a fold-and-dive function, a seat back of a rear seat is folded toward a seat cushion so that the seat back forms a table to secure luggage space.

Most rear seats that are folded as described above are fold-and-dive seats, and a fold-and-dive seat in the related art will now be described with reference to FIG. 1.

As illustrated in FIG. 1, a seat cushion 20 and a seat back 10 are connected by a connection link 23, and a front end portion of the seat cushion 20 is connected to a link 24 that is rotatably coupled to a leg portion 30 installed on a bottom surface of a vehicle body. In this case, one end portion of the link 24 is rotatably coupled to the leg portion 30, and the other end portion thereof is rotatably coupled to a cushion frame 22 (see FIG. 4), so that the link 24 is rotated to make the seat cushion 20 slide forward when the set back 10 is folded.

Also, in a lower end portion of the seat back 10, a recliner for rotatably coupling a back frame 12 of the seat back 10 to the leg portion 30 is installed.

Accordingly, in a state where the seat back 10 has been unfolded upward, the recliner is fixed to provide a space in which a passenger is seated, and while the recliner is operated, the seat back 10 is rotated about the recliner to be folded toward the seat cushion 20. Accordingly, a wide space for loading luggage therein is secured on a luggage trim 40 that is provided in the rear of the rear seat.

On the other hand, when the seat back 10 is folded toward the seat cushion 20, the link 24 that is installed in front of the seat cushion 20 is simultaneously rotated to move the rear seat downward (dive), and this dive operation of the seat becomes possible since the seat cushion 20, the seat back 10, and the connection link 23 are integrally and/or monolithically formed.

However, according to the fold-and-dive rear seat in the related art, as illustrated in FIGS. 2 and 3, bolster portions 11 and 21 of the seat back 10 and the seat cushion 20 become in contact with each other, and thus the seat back 10 of the rear seat is placed with great inclination to the luggage trim 40 to lower the luggage loading capacity.

On the other hand, if the bolster portions 11 and 21 of the seat are formed to be lowered in order to solve the above-described problem, the shape of the seat back 10 becomes flat, and thus the bolster portions 11 on both sides of the seat back 10 are unable to firmly support the passenger during traveling and cornering of the vehicle to cause passenger's dissatisfaction at the seat function.

Accordingly, there is a need for development of a structure that can evenly place the fold-and-dive rear seat and the luggage trim 40 even without lowering the height of the bolster portions 11 and 21 of the seat.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to address the above-mentioned problems occurring in the related art while advantages achieved by the prior art are maintained intact.

Various aspects of the present invention provide for a fold-and-dive apparatus for a vehicle seat, which makes a seat cushion slide forward when a seat back is folded to improve the evenness of the folded seat back and a luggage trim.

Various aspects of the present invention provide for a fold-and-dive apparatus for a vehicle seat having a seat back and a seat cushion connected by a connection link, which includes a protrusion projecting from the seat back that is folded toward the seat cushion, a moving block moving on the connection link by the protrusion when the seat back is folded, a lock plate connected to the moving block by a cable to move upward and downward on the connection link so as to restrain and release the seat cushion, and an elastic member having both end portions installed in the seat cushion and a vehicle body, respectively, to make the seat cushion slide forward.

The fold-and-dive apparatus for a vehicle seat according to various aspects of the present invention may further include a cable guide fixed to the seat back, a fixing bracket fixed to the seat back, and a restoration cable wound on the cable guide and having both end portions fixed to the fixing bracket and the seat cushion, respectively, wherein the cable guide that is rotated when the seat back is restored pulls the restoration cable.

A guide bracket for guiding the moving block may be installed on the connection link, and a guide hole through which the moving block passes is formed on the guide bracket. A locking pin may be installed in the seat cushion and penetrates the connection link to be locked in or unlocked from the lock plate, and a slot for guiding the locking pin that moves together with the seat cushion is formed on the connection link.

According to the fold-and-dive apparatus for a vehicle seat according to the present invention, since the seat cushion slides forward when the seat back is folded, the overlap of bolster portions between the seat back and the seat cushion is minimized, and thus the evenness of the seat back that is folded toward the seat cushion and the luggage trim can be maximally improved.

Also, the seat cushion that slides forward when the seat back is restored can be promptly restored to its original position in interlocking with the seat back.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIGS. 4 to 7C are views illustrating a fold-and-dive apparatus for a vehicle seat according to various embodiments of the present invention.

Figure 1:
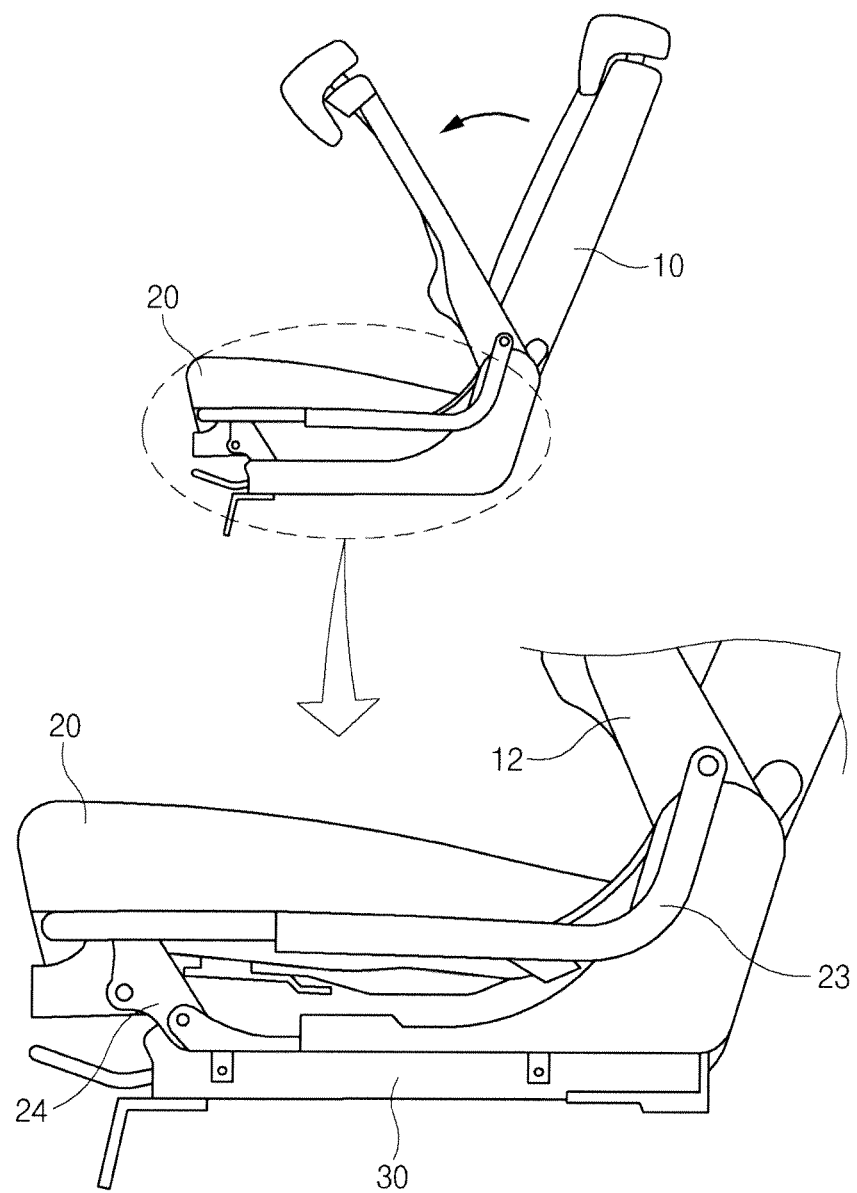
FIG. 1 is a view illustrating a fold-and-dive seat in the related art.
Figure 2:
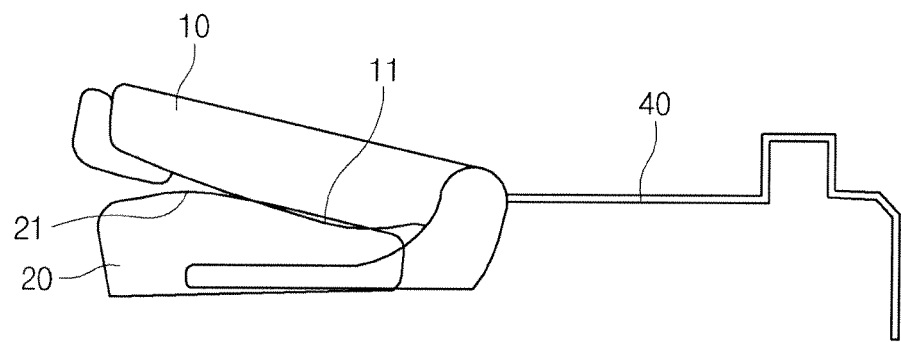
FIG. 2 is a view illustrating a folding state of the fold-and-dive seat in the related art.
Figure 3:
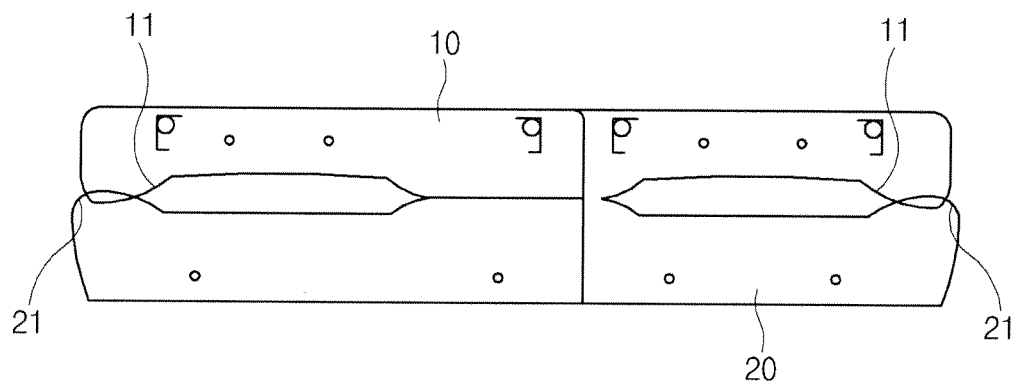
FIG. 3 is a cross-sectional view taken along ling A-A in FIG. 2.
Figure 4:
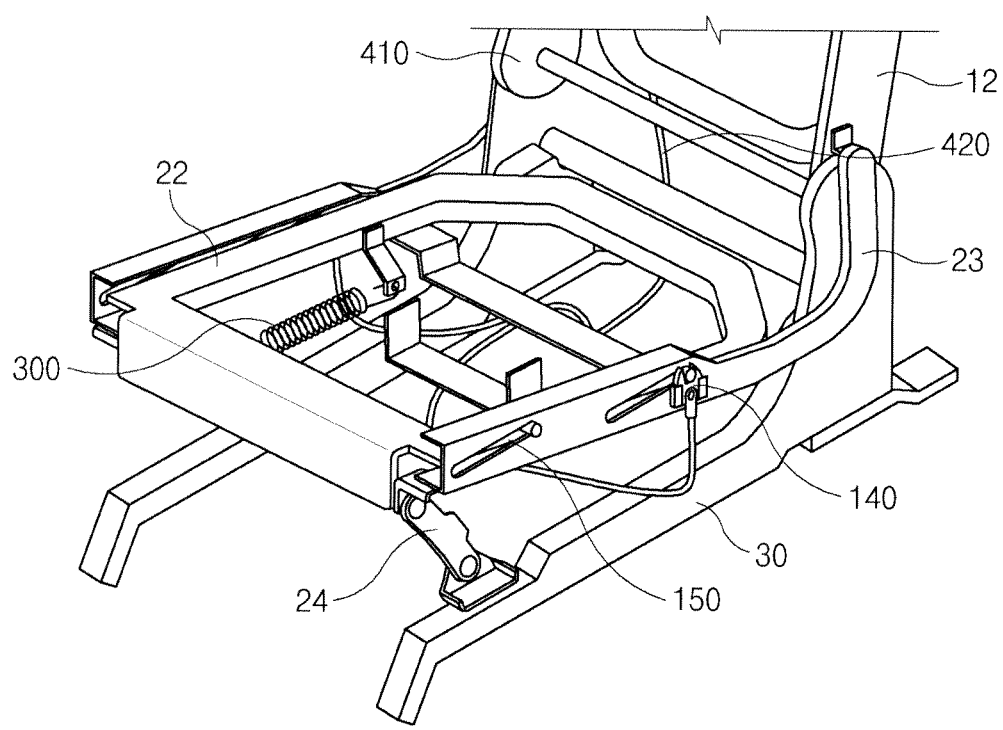
FIG. 4 is a view illustrating an exemplary sliding structure of a seat cushion according to the present invention.
Figure 5:
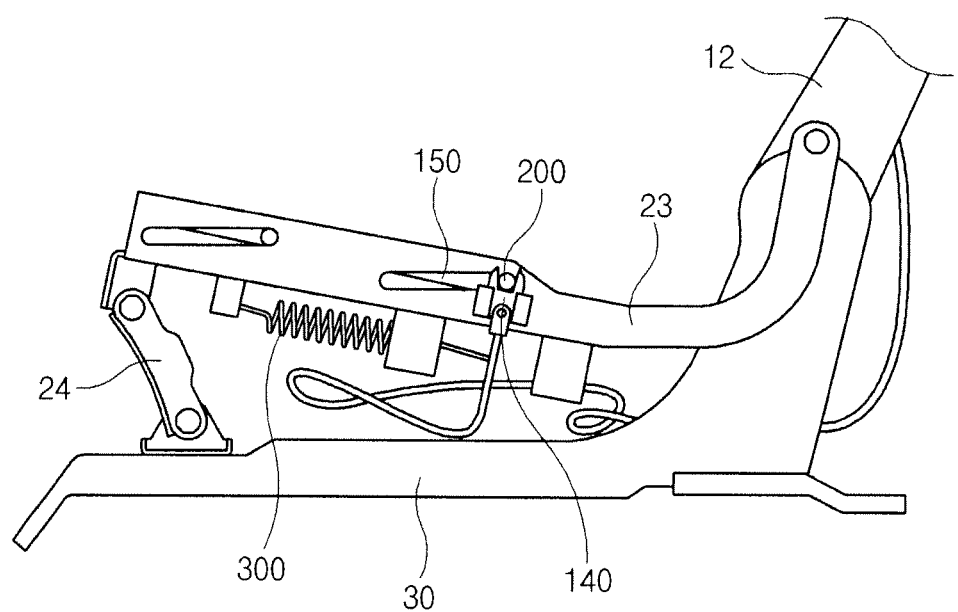
FIG. 5 is a side view of FIG. 4

A vehicle seat according to an embodiment of the invention, as illustrated in FIGS. 4 and 5, generally includes a seat cushion 20 having a cushion frame 22 and a seat back 10 having a back frame 12.

According to a fold-and-dive apparatus for a vehicle seat according to various embodiments of the present invention, the seat cushion 20 and the seat back 10 are connected by a connection link 23, and a front end portion of the seat cushion 20 is connected to a link 24 that is rotatably coupled to a leg portion 30 installed on a bottom surface of a vehicle body. In this case, one end portion of the link 24 is rotatably coupled to the leg portion 30, and the other end portion thereof is rotatably coupled to a cushion frame 22, so that the link 24 is rotated to make the seat cushion 20 slide forward when the set back 10 is folded.

On one side of the seat in which the fold-and-dive apparatus is constructed, a sliding means for sliding the seat cushion 20 forward is provided, and on the other side of the seat, a restoration means for restoring the sliding seat cushion 20 is provided.

Figure 6A:
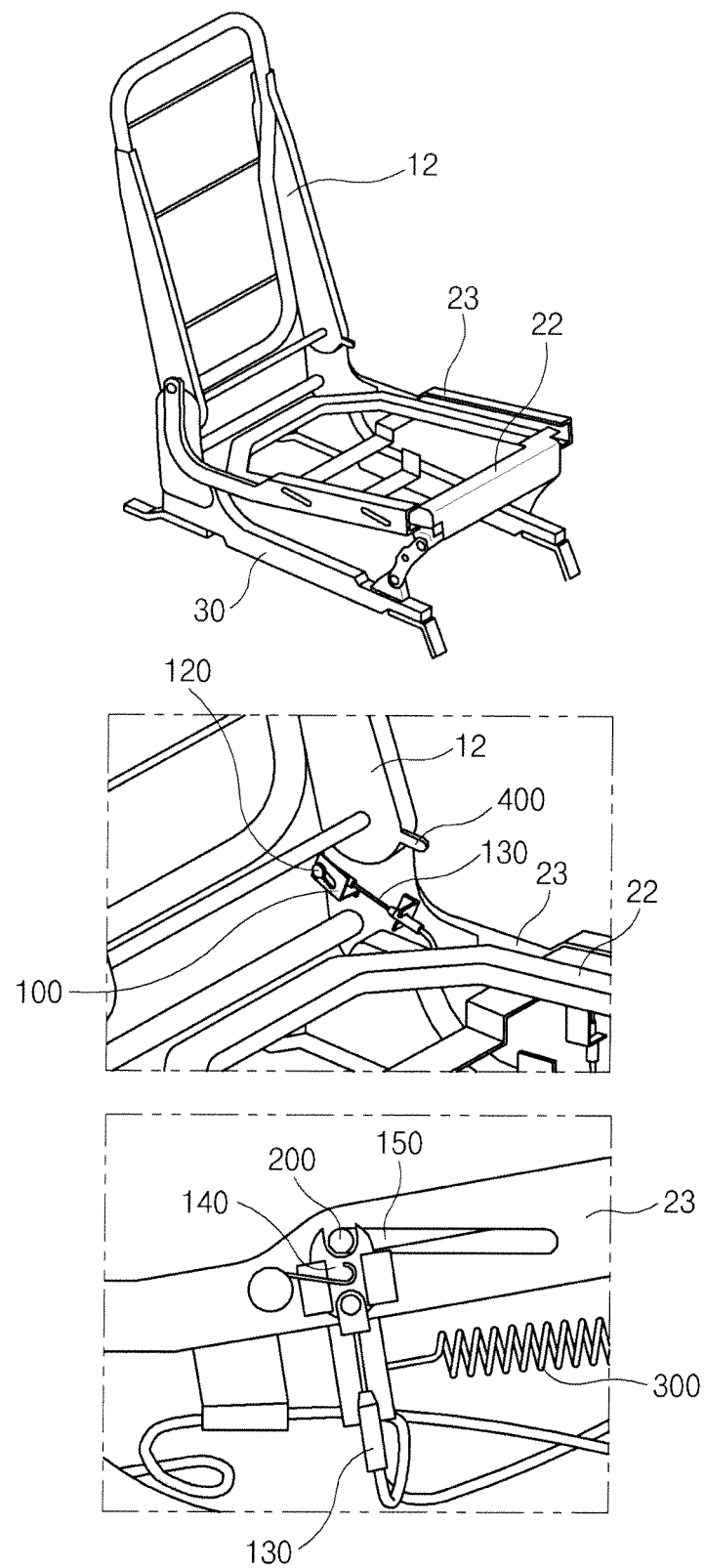
FIGS. 6A to 6C are views illustrating a sliding state of a seat cushion when a seat back of an exemplary fold-and-dive seat is folded according to the present invention.
Figure 6B:
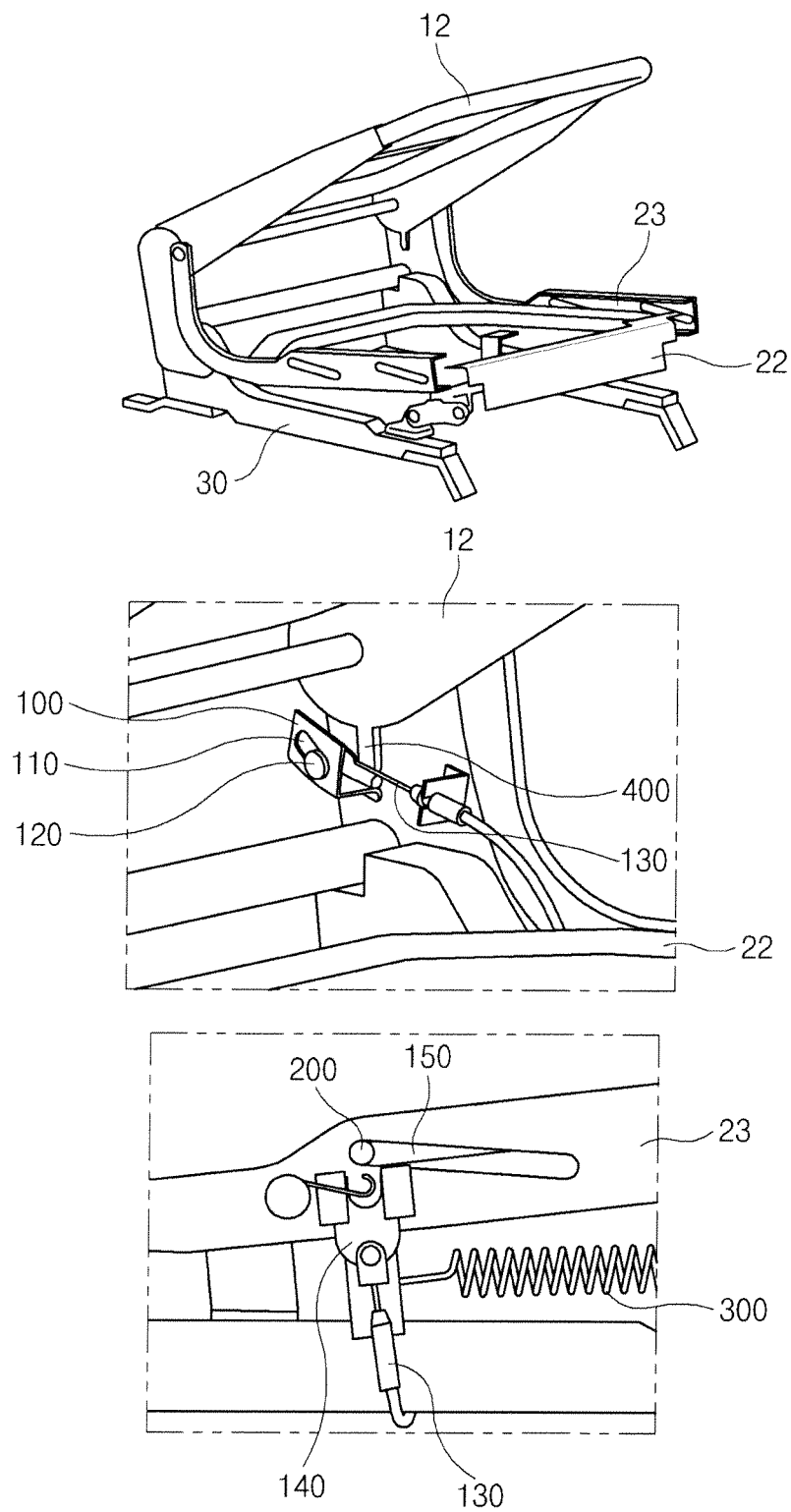
Figure 6C:
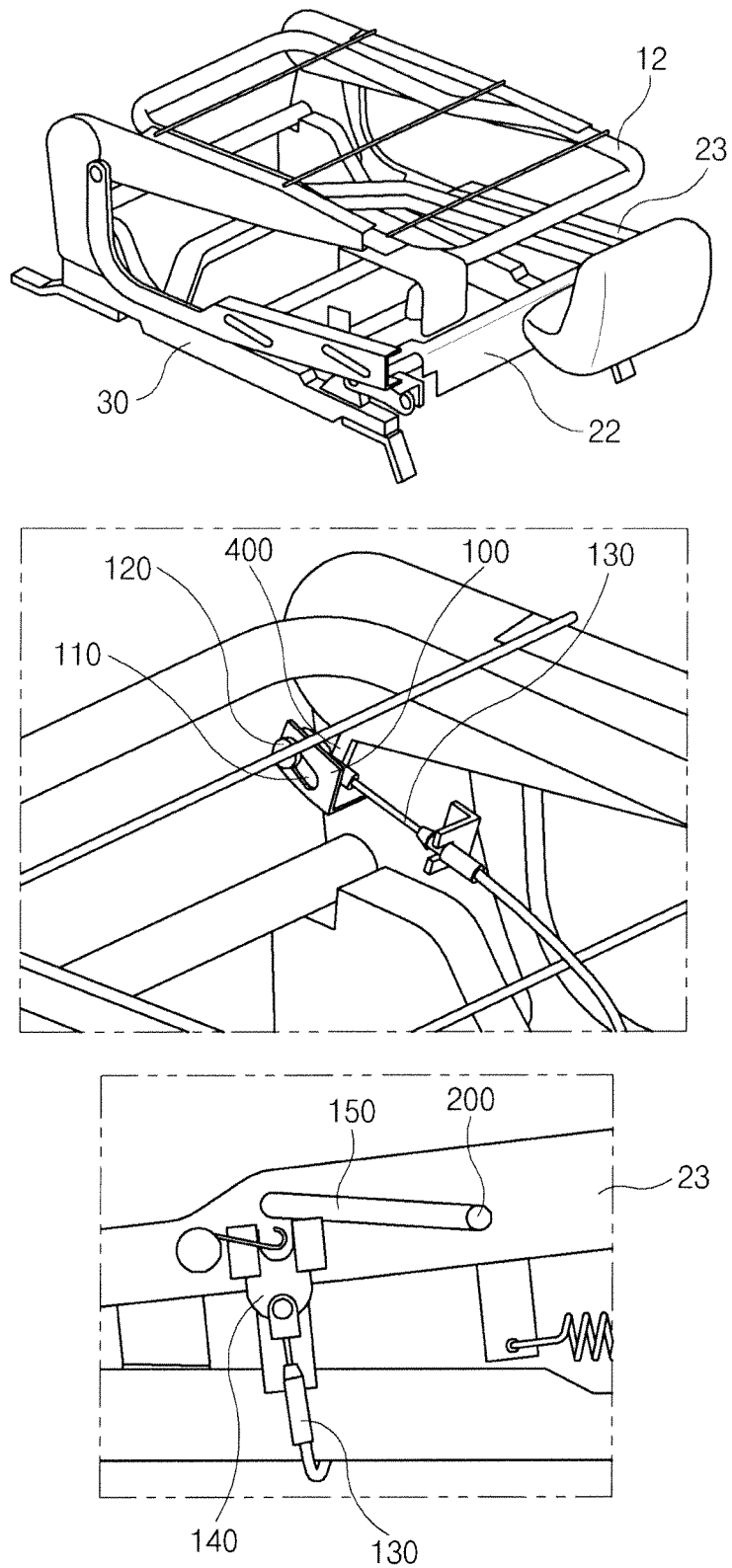

According to the sliding means of the seat cushion 20, as illustrated in FIGS. 6A to 6C, a protrusion 400 is projecting from a lower portion of one side of the back frame 12 of the seat back 10, and is rotated together with the seat back 10.

Also, a guide bracket 100 is formed on one side of the connection link 23 that corresponds to the protrusion 400. A guide hole 110 is formed on the guide bracket 100, and a moving block 120 is installed to pass through the guide hole 110. Accordingly, the moving block 120 moves forward and backward on the connection link 23 along the guide hole 110 of the guide bracket 100. On the other hand, on end of a cable 130 is connected to the moving block 120, and the other end of the cable 130 is connected to a lock plate 140 to be described later.

The lock plate 140 is installed on the connection link 23 to move upward and downward, and is connected to the moving block 120 through the cable 130 to move upward and downward in interlocking with the moving block 120. In particular, a pair of guide blocks for guiding the lock plate 140 that moves upward and downward may be installed on the connection link 23, and a "U"-shaped locking groove is formed on an upper end portion of the lock plate 140 so that a locking pin 200 to be described is firmly locked in the locking groove.

On the other hand, the locking pin 200 that penetrates the connection link 23 is installed to project from the cushion frame 22 of the seat cushion that corresponds to the lock plate 140, and a slot 150 for guiding the locking pin 200 that moves together with the cushion frame 22 is formed on the connection link 23. Accordingly, the locking pin 200 that moves along the slot 150 is locked in or unlocked from the lock plate 140.

Also, an elastic member having both end portions connected to the cushion frame 22 and a leg portion 30 fixed to the vehicle body, respectively, may be installed to make the seat cushion 20 slide forward when the seat back 10 is folded, and the elastic member is composed of a tension coil spring (hereinafter referred to as a "spring") 300 that can maximize the elastic force. Both end portions of the spring 300 are connected to the cushion frame 22 and one side of the leg portion 30 in front of the cushion frame 22.

According to the sliding means of the seat cushion 20, as illustrated in FIG. 6A, in a state where the seat back 10 is unfolded toward the upper portion of the seat cushion 20, the protrusion 400 of the back frame 12 is spaced apart from the moving block 120 on the connection link 23, and at this time, the locking pin 200 of the cushion frame 22 is locked in and fixed to the lock plate 140 on the connection link 23, and the spring 300 is maximally tensed to maximize the elastic force.

Thereafter, if the seat back 10 is rotated and folded toward the seat cushion 20, the link 24 in front of the seat cushion 20 is rotated, and thus the seat back 10 and the seat cushion 20 simultaneously move downward (dive).

Also, as illustrated in FIG. 6B, almost simultaneously with the dive operation of the seat back 10 and the seat cushion 20, the protrusion 400 of the back frame 12 starts pushing of the moving block 120 on the connection link 23 backward, and the lock plate 140, which is connected to the moving block 120 that is pushed backward by the protrusion 400 through the cable 130, moves downward on the connection link 23 by the movement of the moving block 120 to be unlocked from the locking pin 200.

Thereafter, as illustrated in FIG. 6C, if the protrusion 400 of the back frame 12 has completely pushed the moving block 120 on the connection link 23 backward, the lock plate 140 on the connection link 23 has completely moved downward to secede from the locking pin 200. Accordingly, at a moment where the locking pin 200 is unlocked from the lock plate 140, the cushion frame 22 slides forward by the compression force of the tensed spring 300, and this movement of the cushion frame 22 continues until the locking pin 200 is locked in the end portion of the slot 150 of the connection link 23.

Accordingly, through the above-described operation, the seat cushion 20 is further drawn forward from the folded seat back 10, and thus it is not required to lower the height of the bolster portions 11 and 21 of the seat back 10 and the seat cushion 20 to heighten the customer satisfaction with the seat.

Also, the evenness of the seat back 10 and the luggage trim 40 is improved by minimizing the overlap between both bolster portions 11 and 21 which become in contact with each other when the seat back 10 is folded, and the seat back 10 and the luggage trim 40 can be arranged evenly through adjustment of the length of the slot 150 of the connection link 23 in which the locking pin 200 is locked.

Figure 7A:
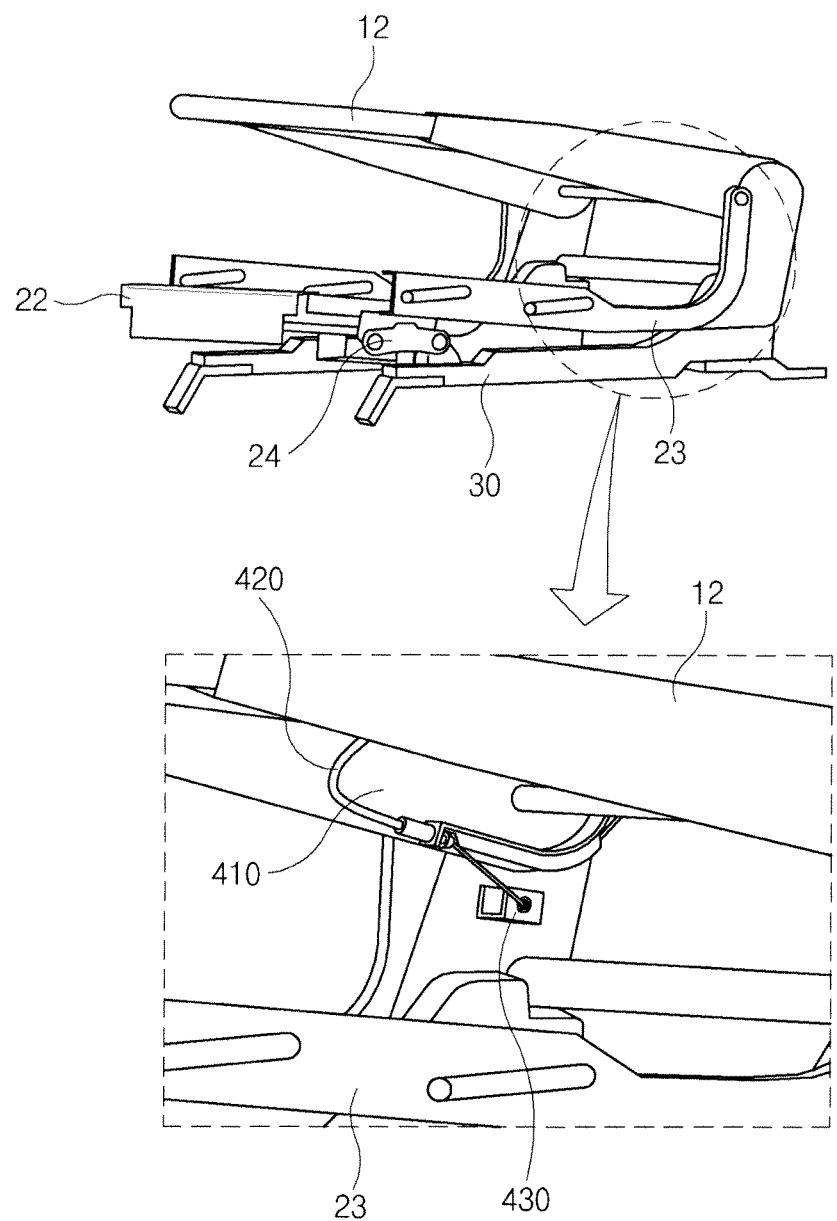
FIGS. 7A to 7C are views illustrating a restoring state of a seat cushion when an exemplary folded seat back is restored according to the present invention.
Figure 7B:
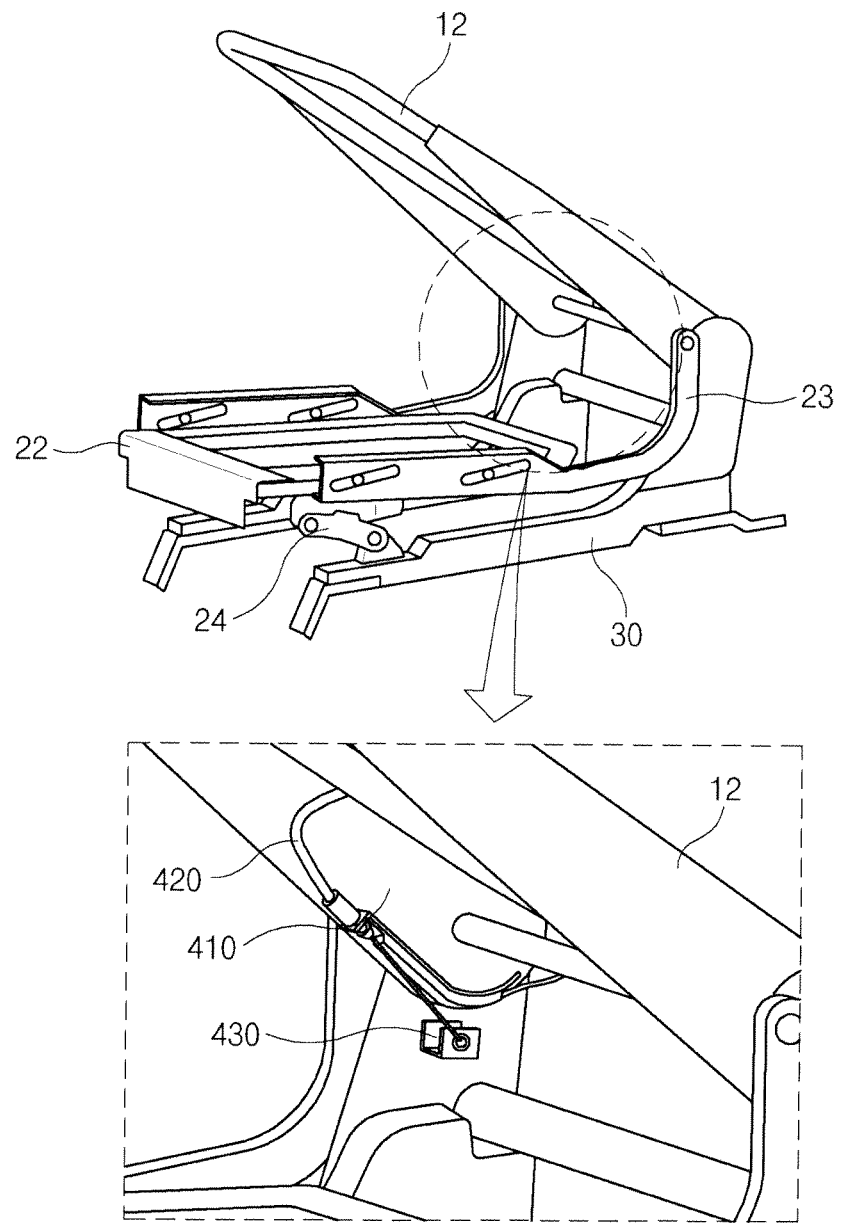
Figure 7C:
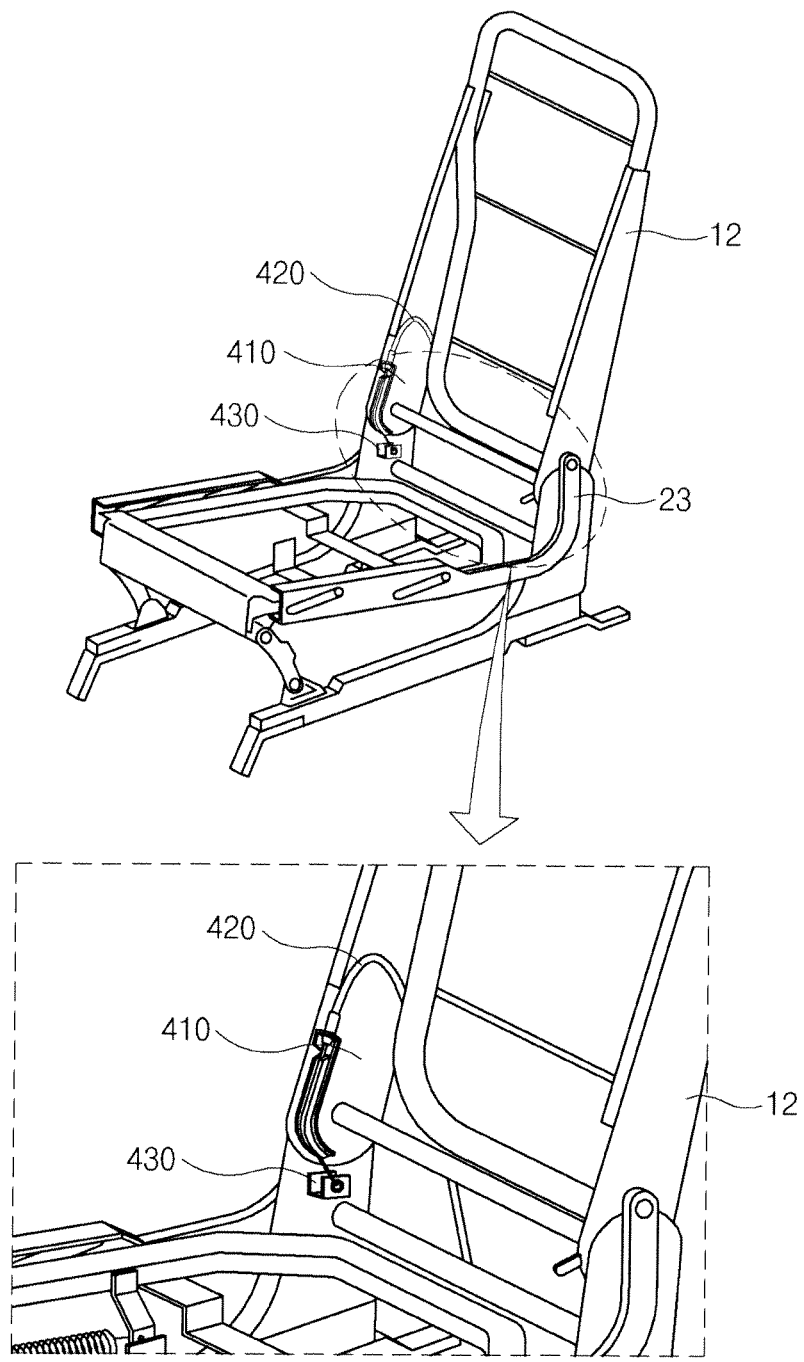

Also, the restoration means of the seat cushion 20, as illustrated in FIGS. 7A to 7C, includes an elliptical cable guide 410 fixed to the other side of the back frame 12, a fixing bracket 430 fixed to the connection link 23 that is spaced apart from the cable guide 410, and a restoration cable 420 wound on the cable guide 410 and having both end portions fixed to the fixing bracket 430 and the seat cushion 20, respectively.

Accordingly, the restoration cable 420 wound on the cable guide 410 is released from the cable guide 410 when the seat back 10 is folded, while the restoration cable 420 is wound on the cable guide 410 to be pulled when the seat back 10 is reversely rotated (is unfolded).

That is, in the restoration means of the seat cushion 20, as illustrated in FIG. 7A, the long shaft of the elliptical cable guide 410 is positioned in the forward and backward directions by the folded seat back 10, and thus the restoration cable 420 is released from the cable guide 410 to enable the cushion frame 22 to be drawn from the folded back frame 12 as shown in FIG. 6C.

Also, as illustrated in FIG. 7B, if the folded seat back 10 is unfolded from the seat cushion 20, the long shaft of the cable guide 410 that is rotated together with the seat back 10 is gradually unfolded to pull the restoration cable 420 backward, and at this time, the compressed spring 300 is gradually tensed.

Thereafter, as illustrated in FIG. 7C, if the seat back 10 has been completely unfolded on the seat cushion 20, the restoration cable 420 is maximally pulled by the cable guide 410, and thus the cushion frame 22 slides backward to be restored to its original position. At this time, the spring 300 is tensed again by the restoration of the cushion frame 22.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A fold-and-dive apparatus for a vehicle seat having a seat back and a seat cushion connected by a connection link, comprising:
    a first link pivotally engaging the seat cushion and a vehicle body;
    a protrusion projecting from the seat back, wherein the seat back is configured to be selectively folded toward the seat cushion according to pivotal motion of the seat back;
    a moving block slidably engaged to the connection link, wherein the moving block moves along the connection link such that as the seat back is folded, the seat back rotates the protrusion and moves the moving block;
    a lock plate connected to the moving block by a cable wherein the lock plate is slidably connected to the connection link and moves upward and downward on the connection link by a force received from the moving block; and
    an elastic member having opposing end portions installed in the seat cushion and the vehicle body, respectively, to make the seat cushion slide forward when the lock plate moves by the force received from the moving block;
    wherein the seat back is rotated and folded toward the seat cushion and the first link is rotated and thus the seat back and the seat cushion simultaneously move downwards while the seat back is folded.

2. The fold-and-dive apparatus for the vehicle seat according to claim 1, further comprising:
    a cable guide fixed to the seat back;
    a fixing bracket fixed to the connection link; and
    a restoration cable wound around the cable guide wherein the restoration cable includes opposing end portions fixed to the fixing bracket and the seat cushion, respectively;
    wherein the cable guide is rotated when the seat back is restored and pulls the restoration cable.

3. The fold-and-dive apparatus for the vehicle seat according to claim 1, wherein a guide bracket for guiding the moving block is installed on the connection link; and
    a guide hole through which the moving block passes is formed on the guide bracket.

4. The fold-and-dive apparatus for the vehicle seat according to claim 1, wherein a locking pin is installed in the seat cushion and penetrates the connection link to be locked in or unlocked from the lock plate; and
    a slot for guiding the locking pin that moves together with the seat cushion is formed on the connection link.

5. The fold-and-dive apparatus for the vehicle seat according to claim 1, wherein the protrusion and the moving block are spaced with each other when the seat back is unfolded.

* * * * *